United States Patent [19]

Anderson

[11] 4,026,976

[45] May 31, 1977

[54] SEALING LEAKS WITH POLYMERIZED MONOMERS

[75] Inventor: Amos R. Anderson, Adrian, Mich.

[73] Assignee: American National Bank & Trust Company of Fort Lauderdale, Trustee, Fort Lauderdale, Fla.

[22] Filed: Dec. 16, 1974

[21] Appl. No.: 533,431

Related U.S. Application Data

[63] Continuation of Ser. No. 302,877, Nov. 1, 1972, abandoned, which is a continuation-in-part of Ser. No. 96,619, Dec. 7, 1970, abandoned.

[52] U.S. Cl. .................................. 264/36; 106/33; 427/142
[51] Int. Cl.[2] ..................... B29C 23/00; B23P 7/00
[58] Field of Search ........... 264/36, 81, 82; 106/33; 117/106 A; 427/140, 142

[56] References Cited

UNITED STATES PATENTS

| | | | |
|---|---|---|---|
| 3,507,725 | 4/1970 | Hylak et al. | 264/36 |
| 3,578,479 | 5/1971 | Packo | 264/36 |
| 3,608,000 | 9/1971 | Anderson | 264/36 |
| 3,634,560 | 1/1972 | Anderson | 264/36 |
| 3,709,712 | 1/1973 | Rossman | 264/36 |
| 3,711,309 | 1/1973 | Packo | 264/36 |

*Primary Examiner*—Jan H. Silbaugh
*Attorney, Agent, or Firm*—Hugo E. Weisberger

[57] ABSTRACT

Leaks in a vessel or pipe line and the like adapted for containing a fluid are sealed by means of a polymerization system comprising a catalytically polymerizable organic monomer and a polymerization catalyst therefor, by first providing a catalytically effective amount of the catalyst at the situs of the leak and then supplying vapor of the monomer to the interior of the vessel under sufficient pressure and for a sufficient period of time to permit contact thereof with the catalyst to effect formation of a polymer providing a solid seal at the situs of the leak.

17 Claims, No Drawings

SEALING LEAKS WITH POLYMERIZED MONOMERS

CROSS-REFERENCE TO RELATED APPLICATION

This application is a continuation of application Ser. No. 302,877 filed Nov. 1, 1972, now abandoned, which was a continuation-in-part of Ser. No. 96,619 filed Dec. 9, 1970, also now abandoned.

BACKGROUND OF THE INVENTION

The present invention relates to a novel process for sealing leaks in pipes, pipelines and vessels.

In an article entitled "Detection, Repair, and Prevention of Gas Leaks", published in the American Gas Journal, August 1959, pages 16–28, it is indicated that the amount of fuel gas lost from pipelines through leakage represents a great economic burden as well as a potential safety hazard. In addition, leakage of fuel gas reduces the effective capacity of a gas distribution system. Another adverse effect of leakage is a reduction in the level of pressure in the distribution mains below desirable limits.

SUMMARY OF THE INVENTION

In accordance with the instant invention there is provided a novel process for sealing leaks in pipes, pipelines and pipe systems, conduits, closed containers, tanks, and closed systems adapted to contain fluids, all of which are hereinafter referred to generally as a vessel.

The process of the invention is particularly adapted for sealing very small leaks in underground piping systems used for conveying fuel gas, as well as for sealing leaks in telephone conduits containing nitrogen or other inert gas under pressure.

The invention not only eliminates leakage of gas into the atmosphere, but also into the surrounding soil or through joint packing materials. The air and the other surrounding materials which may be involved in the sealing operation are accordingly referred to herein as the ambient environment.

The sealing method of the present invention is particularly adapted for the sealing of leaks in piping systems employing joints of the type sealed by fibrous packings, but it is not to be regarded as limited thereto. Fibrous packed joints are extensively employed in city gas distribution systems in which cast iron pipe sections are connected by bell-and-spigot type joints caulked with fibrous packing, usually jute fiber. However, the method of the invention may also be employed for sealing small hole type leaks, such as those caused by corrosion, in the body of the pipe sections.

In U.S. Pat. No. 3,507,725 there is disclosed a method of repairing gas main fibrous packed joints with a liquid sealing material which may be a liquid monomer such as styrene monomer, by introducing the monomer into the gas main in liquid form, and permitting it to flow to a low point in the system where a leaking joint exists, the packing of which becomes saturated with the sealant which then polymerizes over a relatively long period of time, namely six weeks to three months. Styrene is substantially nonvolatile, having a boiling point of 145.2° C., and no specific catalyst is named in the patent.

U.S. Pat. No. 3,578,479 discloses sealing leaks in a vessel and the like with a sealant agent which is either a silicon hydride, a boron hydride, an alkoxide borane, or a metal alkyl. None of these substances is a polymerizable organic monomer, and the solid seal which is formed when they are introduced into the vessel and exposed to the ambient environment via the leak results from the formation of solid metal oxides or metal alkoxide complexes with oxygen and/or moisture present at the situs of the leak, and not from polymerization.

Likewise, U.S. Pat. No. 3,608,000 discloses the introduction into a vessel of sealants which are mixtures of volatile organosilanes and metal alkyls which react chemically to form solid products in accordance with the equations set forth at column 2, lines 4–5 of the patent. These are not polymerization reactions, and the products formed are not polymers.

DETAILED DESCRIPTION OF THE INVENTION

The present invention employs the novel principle of sealing a leak in a vessel or pipeline or the like by introducing into the interior of the vessel in vapor form a normally gaseous or volatilizable or volatilized organic monomer which is capable of polymerizing in contact with a catalytic polymerization agent. The catalytic agent may be heat, moisture, or a chemical type catalyst, such as a metal alkyl, or an alkali, or a combination of these agents. Polymerization is effected at the situs of the leak where in contact with the catalytic agent, the monomer forms a solid polymeric product which acts as a seal.

Advantageously, the vapors of the organic monomer may be introduced in admixture with a gaseous vehicle or carrier which is inert to the monomer, as well as to the catalyst.

Where desirable, the pipeline or vessel may be first flushed with an inert gas, before the catalyst, or the monomer, or both together, are introduced.

The inert gaseous vehicle or the flushing gas may be, for example, nitrogen, helium, or natural gas.

The concentration of monomer vapor employed will depend upon the type of monomer, the type of sealing problem present, the nature and size of the leaks, the environmental conditions of the vessel or pipeline, and the like. In general, the concentration of monomer will be of the order of about 25,000 to 50,000 parts per million, but this is to be considered as illustrative, and not as limiting.

Besides employing the novel principle of introducing the monomer into the interior of the system in vapor form, the present invention employs the further novel feature of providing a catalytically effective amount of the catalytic agent at the situs of the leak either prior to or during the introduction of the monomer vapors into the vessel or pipeline. Thus, depending upon the type of monomer and catalyst employed, the catalyst and monomer may be introduced simultaneously, or sequentially. In either case the catalyst will be present at the situs of the leak when the monomer vapors arrive there, so that the polymerization reaction may take place within a relatively short time, usually a matter of a few hours.

Thus, in accordance with one aspect of the practice of the invention, illustrated by the polymerization system acrolein-moist ammonia in Example 1 below, the catalyst is introduced into the vessel first, in vapor form, so as to reach the points where leakage may be taking place. In the case of an underground pipeline or gas main the leakage may be taking place at jute packed joints, or at corrosion sites, into the surrounding soil. In such cases a matrix of either jute or soil is available to absorb the catalyst vapors, providing a site for the polymerization to take place when the site is subsequently contacted by the vapors of the monomer. The catalyst and/or the monomer are each introduced into the vessel under a pressure sufficient to permit escape of their vapors from the leak into the ambient environment. The materials are supplied for a period of time sufficient to allow polymer formation and the establishment of a solid seal at the situs of the leak. This point is usually indicated by a build-up of pressure within the vessel to a steady level.

A polymerization system of the character described is that of an unsaturated aldehyde monomer which is polymerizable by means of an alkaline catalyst. Illustrative of such a system is one employing acrolein (acrylic aldehyde) as the polymerizable monomer. This monomer is readily volatile, having a boiling point of 52.5° C, and a vapor pressure of 214 mm. Hg at 20° C. The catalyst is ammonia $NH_3$, which can be used either as dry gas, or preferably with some moisture present, thereby forming ammonium hydroxide $NH_4OH$.

When this system is employed to seal a pipeline, such as, for example, a gas main distribution system utilizing jute packed joints, there must be taken into consideration the mode of operation of the line. Some gas systems are used for transmission of dry natural gas, and in these the jute packing may have hardened so that it is difficult for the ammonia to be taken up by the jute. In such situations, in order to insure the presence of the catalyst at the joint or point of leakage into the surrounding soil, it is necessary to pretreat the line by injection of moisture to the level needed to render the packing absorbtive of both the moxture and subsequently of the ammonium hydroxide formed. In other gas systems, the practice is to maintain a level of moisture in the line sufficient to keep the packing in condition. A moisture level of upwards of 10% is desirable in both cases.

Thus, the portion of the gas main to be sealed is first cut out of the system, moisture is introduced, if necessary, to the desired level, at the same time displacing the transmitted natural or other fuel gas, then ammonia gas is injected into the pipe portion. The ammonia saturates the jute packing, or escapes into the surrounding soil via a leak hole, as the case may be. Although most soils contain some moisture, under actual conditions it is preferable to introduce sufficient moisture into the system to assure proper polymerization conditions. Thereafter the acrolein is introduced into the system in vapor form, preferably admixed with an inert vehicle gas, polymerizing upon contact with the ammonia catalyst at the situs of the leak, thereby effecting a seal. This cycle may be repeated as many times as required to reach a steady internal pressure indicative of sealing of leakage.

In accordance with a second aspect of the invention, it is possible to employ a polymerization system in which the monomer and catalyst vapors are introduced into the vessel or pipeline together, the reaction being one in which a moderate amount of heat is required to effect polymerization. The catalyst may be a compound such as a metal alkyl, which upon contact with moisture will react therewith with evolution of heat, producing anhydrous conditions, the remainder of the catalyst then performing a direct catalytic function to effect the polymerization. An illustrative system of this type is that wherein the organic monomer is a multi-ethylenically unsaturated hydrocarbon, such as, for example, isoprene (2-methyl-1,3-butadiene), and the catalyst is an aluminum or a lithium alkyl, such as for example, aluminum triethyl, as set forth in Example 2, below.

In the isoprene-aluminum triethyl system, the isoprene is a volatile monomer, having a boiling point of 34° C. Where the opening to be sealed is a hole surrounded by soil, there will usually be sufficient moisture present to react with the aluminum triethyl to generate the required heat for polymerization. Where fibrous packing is involved, whatever moisture is needed can first be supplied to the jute leak site. The vapors of isoprene and aluminum triethyl can then be injected together, if desired in an inert vehicle carrier. Upon reaching the situs of the leak, the aluminum triethyl reacts with the moisture present, generating heat sufficient to permit it to perform its function as a catalyst, and the reactants enter into the jute or soil matrix to effect polymer formation and sealing of the leaks.

It will be understood that the specific polymerization systems set forth above to explain the practice of the two different aspects of the invention are to be regarded solely as illustrative and not as limiting, and that the two modes of procedure may be carried out with any similarly functioning appropriate polymerization systems.

DESCRIPTION OF THE PREFERRED EMBODIMENTS

The following examples illustrate the practice of the invention, but are not to be considered as limiting.

EXAMPLE 1

A section of gas main having a single bell-and-spigot joint packed with jute was provided with simulated leakage points in the jute packing and with a 1.0 mm diameter hole in the pipe section, and buried in the soil. The pipe section was sequentially treated as follows: (1) in order to moisturize the packing and surrounding soil, a stream of nitrogen gas bubbled through water was introduced for a period of one half hour. (2) a stream of pure ammonia gas was injected for a period of one half hour. (3) the ammonia gas was purged out of the system with nitrogen, and there was introduced a stream of nitrogen gas saturated with acrolein vapor for a period of one half hour. Each vapor stream flowed at a rate of 1 standard cubic foot per hour. The sequence was repeated for a total period of 13 hours, at which time there was no further loss indicated on a pressure gage. A yellow polymer was found to have deposited within the jute packing and in the soil around the buried opening, and had consolidated the soil to a rigid mass.

EXAMPLE 2

A steel pipe section (7 feet long, ¾ inch diameter) was drilled with an ⅛ inch hole to simulate a leak. The test pipe was buried under 30 inches of clay loam soil of 6.3% moisture content. One end of the pipe was connected to a valve-controlled feed line connected to a source of dry nitrogen gas for purging the pipe of any moisture or oxygen, and also as an inert gas carrier for the sealant composition. The nitrogen line was also connected to a heated bubbler vessel containing the liquid sealant composition. Pressure and flow indicators and monitors were also connected in the feed line. The other end of the test pipe was connected to a valved outlet line connected to a pressure gage and pressure recorder. The test pipe was first purged with a stream of dry nitrogen gas to remove oxygen and moisture. The room temperature ranged from 68° to 76° F. Isoprene monomer and aluminum triethyl in slight excess were introduced into the nitrogen gas stream bubbler indicated above, so as to provide a concentration of about 25,000–50,000 parts per million. At the point of leakage, the aluminum alkyl reacted with moisture there present (soil moisture), generating heat and producing anhydrous conditions at the situs of the leak. The excess alumnum alkyl then acted as a catalyst to effect the isoprene polymerization, sealing the holes and the outer opening area with a solid rubbery polymer plug.

I claim:

1. A method of forming a seal at the situs of a leak located in a vessel by polymerizing an organic monomer said monomer being capable of being polymerized into an organic polymer seal, comprising introducing into the interior of said vessel said polymerizable organic monomer in gaseous state and introducing into said vessel a polymerization catalyst for said monomer in the gaseous state, both the monomer and the catalyst being introduced under sufficient pressure and for a sufficient period of time contact said provide said catalyst at said leak situs and to contact said leak situs with said monomer while said catalyst is present, thereby to form said organic polymer seal at the situs of the leak.

2. The method of claim 1 wherein the monomer is an unsaturated aliphatic aldehyde and the catalyst is a substance which produces alkaline conditions at the leak situs, and there is sufficient moisture present at the leak situs to permit the polymerization of the monomer into said polymeric seal at the leak situs.

3. The method of claim 2 wherein the catalyst is ammonia gas.

4. The method of claim 1 wherein the monomer is an unsaturated aliphatic aldehyde and the catalyst is a substance which produces alkaline conditions at the leak situs, and there is insufficient moisture present at the leak situs to permit the polymerization of the monomer into said polymeric seal at the leak situs, including the additional step of:

providing sufficient moisture at the leak situs to permit the polymerization of the monomer into said polymeric seal at the leak situs.

5. The method of claim 4 wherein the catalyst is ammonia gas.

6. The method of claim 1 wherein the monomer is a multi-ethylenically unsaturated hydrocarbon.

7. The method of claim 6 wherein the monomer is isoprene.

8. The method of claim 6 wherein the catalyst is a metal alkyl compound.

9. The method of claim 1 wherein the polymerization of the monomer is catalyzed by the application of heat; said catalyst reacts exothermically with moisture; and a sufficient amount of said moisture is present at the situs of the leak so that a portion of said catalyst reacts therewith to release heat to catalyze said polymerization.

10. The method of claim 1 wherein the polymerization of the monomer is catalyzed by the application of heat; said catalyst reacts exothermically with moisture; and an insufficient amount of said moisture is present at the situs of the leak to permit reaction with said catalyst to release heat sufficient to catalyze said polymerization, including the additional step of:

providing a sufficient amount of said moisture at the leak situs so that a portion of said catalyst reacts therewith to release heat to catalyze said polymerization.

11. The method of claim 10 wherein said moisture is provided at the leak situs prior to the arrival at the leak situs of the monomer.

12. The method of claim 10 wherein said is provided at the leak situs prior to the arrival at the leak situs of the catalyst.

13. A method of forming a seal at the situs of a leak located in a vessel by catalytically polymerizing an organic monomer, said monomer being capable of being polymerized into an organic polymer seal, comprising:

a. introducing into the interior of the vessel in gaseous state a polymerization catalyst for said monomer, under sufficient pressure and for a sufficient period of time to place at least a catalyst portion thereof at the leak situs; and b. while at least a catalytic portion of the catalyst remains at said leak situs, introducing said monomer into the interior of the vessel in gaseous state under sufficient pressure and for a sufficient period of time so that said monomer is polymerized at said leak situs into an organic polymer seal.

14. A method of forming a seal at the situs of a leak located in a vessel by polymerizing an organic monomer, said monomer being capable of being polymerized into an organic polymer seal, wherein said polymerization is catalyzed by heat generated by reacting a heat-evolving compound with moisture, comprising:

a. providing a sufficient amount of said moisture at said leak situs so that upon contact therewith by said heat-evolving compound sufficient heat is generated to catalyze said polymerization;

b. introducing said heat-evolving compound into the interior of said vessel in gaseous state under a sufficient pressure and for a sufficient period of time to react with said moisture to generate sufficient heat at said leak situs to catalyze said polymerization, said heat-evolving compound characterized as reacting with moisture to generate heat; and c. introducing the monomer into the interior of said vessel in gaseous state under a sufficient pressure and for a sufficient period of time to form a polymeric seal.

15. The method of claim 14 wherein the monomer and the heat evolving compound are introduced simultaneously.

16. The method of claim 14 wherein the heat-evolving compound is further characterized as capable of catalyzing said polymerization under anhydrous conditions.

17. The method of claim 15 wherein the monomer is isoprene and the heat evolving compound is a metal alkyl compound.

* * * * *

UNITED STATES PATENT OFFICE
CERTIFICATE OF CORRECTION

Patent No. 4,026,976     Dated May 31, 1977

Inventor(s) Amos R. Anderson

It is certified that error appears in the above-identified patent and that said Letters Patent are hereby corrected as shown below:

Claim 1, column 5, line 26, "contact said" should read --to--.

Claim 12, column 6, line 14, "moisture should be inserted between "said" and "is provided".

Claim 13, column 6, line 25, "catalyst" should read --catalytic--.

Signed and Sealed this sixteenth Day of August 1977

[SEAL]

Attest:

RUTH C. MASON
Attesting Officer

C. MARSHALL DANN
Commissioner of Patents and Trademarks